Patented Sept. 2, 1952

2,609,378

UNITED STATES PATENT OFFICE 2,609,378

PROCESS FOR PRODUCING TESTOSTERONE

George Rosenkranz, Stephen Kaufmann, and Jesús Romo, Mexico City, Mexico, assignors to Syntex, S. A., Mexico City, Mexico, a corporation of Mexico No Drawing. Application December 23, 1948, Serial No. 67,094. In Mexico October 21, 1948

9 Claims. (Cl. 260—397.4)

The present invention relates to new enolthioethers of testosterone and to a novel process for the production of these ethers, the acyl esters thereof, and for the production of testosterone and acyl esters of testosterone.

In the copending application of George Rosenkranz and Stephen Kaufmann, Ser. No. 16,886, filed March 24, 1948, a process is disclosed for the production of 17-hydroxy steroids by the addition of lithium aluminum hydride (LiAlH$_4$) to the carbonyl group of 17-keto steroids and subsequent hydrolysis of the metal alcoholate complex formed. As pointed out in this prior application, the method in general is advantageous over prior methods for the conversion of the 17 keto group to the 17-hydroxy group.

In accordance with the present invention, it has been discovered that the 3 enol thioethers of $\Delta^4$-androstendione may be reacted with lithium aluminum hydride, both components being dissolved in a suitable dry inert solvent, preferably an ether or mixtures thereof, such as dry diethyl ether, dioxan, tetrahydrofuran, etc., and the addition product hydrolysed as by addition of water to produce the corresponding 3 enol thioether of testosterone. This reaction was unexpected since any of the other known agents including sodium and alcohol, and catalytic hydrogenation when applied to the 3 enol thioethers of $\Delta^4$-androstendione attacked the enol thioether group.

The resulting 3 enol thioethers of testosterone are valuable hormone intermediates since the hormone testosterone can be produced therefrom by hydrolysis in the known manner by means of dilute mineral acids, such as dilute hydrochloric acid, or by means of cadmium carbonate and mercuric chloride.

It has also been found in accordance with the present invention that the 3 enol thioethers of testosterone previously described can be acylated with suitable acylating agents such as acyl halogenide and pyridine to produce the corresponding esters of the 3 enol thioethers of testosterone. Hydrolysis of these esters with mineral acids, or cadmium carbonate and mercuric chloride produces corresponding esters of testosterone. The method has been found to be generally applicable to the production of any of the well known esters of testosterone such as testosterone benzoate, testosterone acetate, testosterone propionate, etc.

The above methods are especially applicable for the production of novel thioethers of testosterone which are believed to have the following formula:

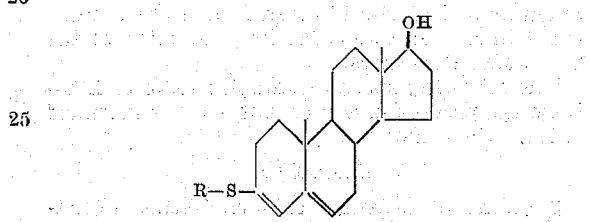

wherein R may be a lower alkyl group, substituted or unsubstituted by a $\beta$ hydroxyl group, or a phenyl lower alkyl group.

The previously described reactions for the production of the compounds hereinbefore set forth can be illustrated by the following formula:

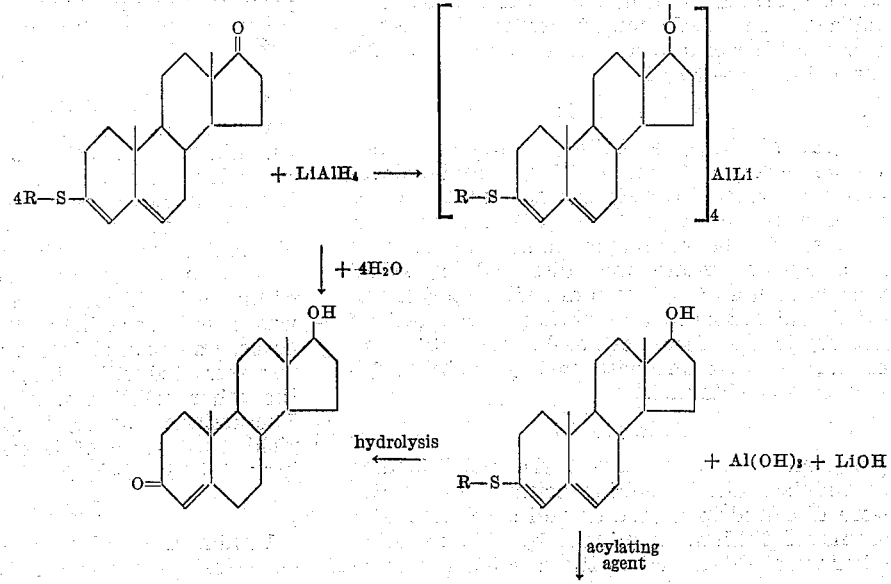

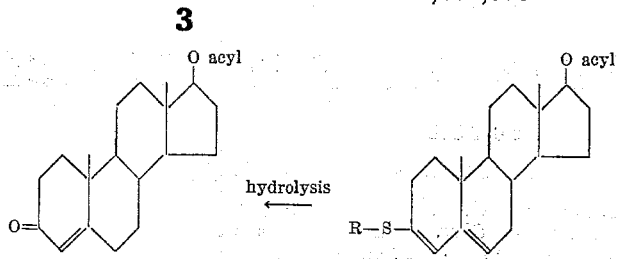

In the above equations R is the same as hereinbefore set forth.

The initial starting compounds, i. e. the enol thioethers may be made by known methods, for example, by reacting $\Delta^4$-androstendione with equimolecular amounts of the equivalent mercaptan, i. e. the lower alkyl mercaptans, wherein the alkyl group is unsubstituted or substituted by a β hydroxyl group, or a phenyl lower alkyl mercaptan. Suitable mercaptans are, for example, methyl mercaptan, ethyl mercaptan, propyl mercaptan, β hydroxy ethyl mercaptan, benzyl mercaptan and phenyl ethyl mercaptan. However, any appropriate mercaptan may be reacted together with a suitable catalyst such as p-toluene sulphuric acid, the reaction for the formation of the enol thioethers being similar to the formation of the corresponding enol ethers from $\Delta^4$-androstendione and alcohols, as set forth in the patent to Koster 2,363,338, November 21, 1944, and the patent to Miescher, 2,344,997, March 28, 1944. Dehydrating agents, such a fused zinc chloride and anhydrous sodium sulphate, such as disclosed in the patent to Darfman and Bernstein, 2,451,434, may also be used. In all instances, however, approximately equimolecular amounts of the $\Delta^4$-androstendione and the mercaptan are used to ensure the production of the mono enol thioethers.

The following specific examples serve to illustrate the present invention but are not intended to limit the same:

Example I 3 grams of 3-benzyl thio enol-ether of $\Delta^4$-androstendione (melting point 177°–179° C.) are dissolved in dried ether and a solution of 2 grams of lithium aluminum hydride in dried ether was added. When the reaction was complete the complex was hydrolyzed by addition of water and the reaction product was extracted with benzene. After drying the benzene solution it was evaporated to dryness and the residue crystallized from methanol. 2 grams of 3 benzyl enol thioether of testosterone was obtained, melting point 168°–169° C.

Example II 1 gram of 3 benzyl enol thioether of testosterone was dissolved in 100 cc. of alcohol and 4 drops of concentrated hydrochloric acid and 3 cc. of water were added. The reaction mixture was refluxed for 2 hours and poured into water. The resulting precipitate was dissolved in ether, washed with a 5% solution of sodium carbonate, dried and evaporated to dryness. The residue was crystallized from acetone-hexane. 0.4 gram of pure testosterone with melting point 150°–153° C. was obtained.

Example III 9 grams of 3(β-hydroxy-ethyl) enol thioether of androstendione (melting point 166°–167° C.) were dissolved in dry ether and a solution of 3 grams of lithium aluminum hydride in dried ether were added. When the reaction was complete water was added and the reaction product was worked up as in Example I, whereby 6 grams of the 3(β-hydroxy-ethyl) enol thioether of testosterone with melting point of 175°–177° C. was obtained.

Example IV 1.5 grams of 3(β-hydroxy-ethyl) enol thioether of testosterone were dissolved in 50 cc. of alcohol and 4 drops of concentrated hydrochloric acid and 3 cc. of water were added. The reaction mixture was refluxed for 2 hours and poured into water. The resulting precipitate was dissolved in ether, washed with a 5% solution of sodium carbonate, dried and evaporated to dryness. The residue was crystallized from acetone-hexane. One gram of pure testosterone was obtained.

Example V 4 grams of 3-benzyl enol thioether of testosterone were dissolved in 10 cc. of dried pyridine and 5 cc. of benzyl chloride were added. The reaction mixture after 16 hours of standing at room temperature was poured into water and extracted with chloroform. The chloroform solution was washed with dilute sulphuric acid and a solution of sodium carbonate and water until neutral. After drying and evaporating the chloroform solution, the residue was crystallized from ether-methanol, and yielded 2 grams of the benzoate of 3-benzyl enol thioether of testosterone, melting point 160°–161° C.

Example VI 7 grams of the benzoate of 3-benzyl enol thioether of testosterone were dissolved in 200 cc. of ethanol and 3 drops of concentrated hydrochloric acid and 2 cc. of water were added. The reaction mixture was refluxed for 2 hours and poured into water. The resulting precipitate was extracted with ether, washed until neutral and evaporated to dryness; the residue was crystallized from methanol, and yielded 0.3 gram of the benzoate of testosterone, melting point 190°–194° C.

Example VII 1 gram of the 3-benzyl enol thioether of testosterone was dissolved in 5 cc. of dried pyridine; the mixture was cooled in ice and 8 cc. of acetyl chloride were added drop by drop. After standing for 16 hours at room temperature the solvents were evaporated in vacuo to dryness. The oily residue was dissolved in 200 cc. of acetone and 2 grams of cadmium carbonate and 2 grams of mercuric chloride were added. The mixture was refluxed for 4 hours, filtered, concentrated to 40 cc. and poured into water. The precipitate was extracted with ether, washed with water and the ether solution was dried and evaporated. The residue was crystallized from hexane and yielded 0.3 gram of testosterone acetate, melting point 138°–140° C.

Example VIII 1 gram of 3-(β-hydroxy-ethyl) enol thioether of testosterone was dissolved in 5 cc. of dried pyridine. The mixture was cooled in ice and 8 cc. of propionyl chloride were added drop by drop. After standing for 16 hours at room temperature, the solvents were evaporated in vacuo to dryness and the residue was worked up as described in Example VII and yielded 0.2 gram of testosterone propionate, melting point 119°–121° C.

We claim:

1. A method for the preparation of 3 enol thioethers of testosterone comprising reacting 3 enol thioethers of $\Delta^4$-androstendione with lithium aluminum hydride under anhydrous conditions to form the lithium aluminum derivative of the 3 enol thioethers of $\Delta^4$-androstendione and adding water thereto to hydrolyze the lithium aluminum derivative.

2. A method for the preparation of testosterone comprising reacting 3 enol thioethers of $\Delta^4$-androstendione with lithium aluminum hydride under anhydrous conditions to form the lithium aluminum derivative of the 3 enol thioethers of $\Delta^4$-androstendione, adding water thereto to hydrolyze the lithium aluminum derivative to produce 3 enol thioethers of testosterone and hydrolyzing said enol ethers to testosterone.

3. A method for the preparation of testosterone comprising hydrolyzing 3 enol thioethers of testosterone with dilute mineral acids.

4. A method for the preparation of testosterone comprising hydrolyzing 3 enol thioethers of testosterone with cadmium carbonate and mercuric chloride.

5. A method for the preparation of the esters of 3 enol thioethers of testosterone comprising reacting 3 enol thioethers of $\Delta^4$-androstendione with lithium aluminum hydride under anhydrous conditions to form the lithium aluminum derivative of the 3 enol thioethers of $\Delta^4$-androstendione, adding water thereto to hydrolyze the lithium aluminum derivative to produce the 3 enol thioethers of testosterone and acylating said ethers to prepare the corresponding esters of the 3 enol thioethers of testosterone.

6. A method for the preparation of the esters of 3 enol thioethers of testosterone comprising acylating the 3 enol thioethers of testosterone.

7. A method for the preparation of esters of testosterone comprising reacting 3 enol thioethers of $\Delta^4$-androstendione with lithium aluminum hydride under anhydrous conditions to form the lithium aluminum derivative of the 3 enol thioethers of $\Delta^4$-androstendione, adding water thereto to hydrolyze the lithium aluminum derivative to produce the 3 enol thioethers of testosterone, acylating said ethers to prepare the corresponding esters of the 3 enol thioethers of testosterone and hydrolyzing said esters.

8. A method for the preparation of esters of testosterone comprising hydrolyzing the esters of 3 enol thioethers of testosterone with dilute mineral acids.

9. A method for the preparation of esters of testosterone comprising hydrolyzing the esters of 3 enol thioethers of testosterone with cadmium carbonate and mercuric chloride.

GEORGE ROSENKRANZ.
STEPHEN KAUFMANN.
JESÚS ROMO.

REFERENCES CITED

The following references are of record in the file of this patent:

UNITED STATES PATENTS

| Number | Name | Date |
|---|---|---|
| 2,451,434 | Dorfman | Oct. 12, 1948 |

OTHER REFERENCES

Nystrom et al.: Jour. Am. Chem. Soc., 69, 1197–1199 (1947).